March 10, 1964 C. HAYES 3,124,056
COFFEE INFUSERS
Filed Aug. 27, 1962
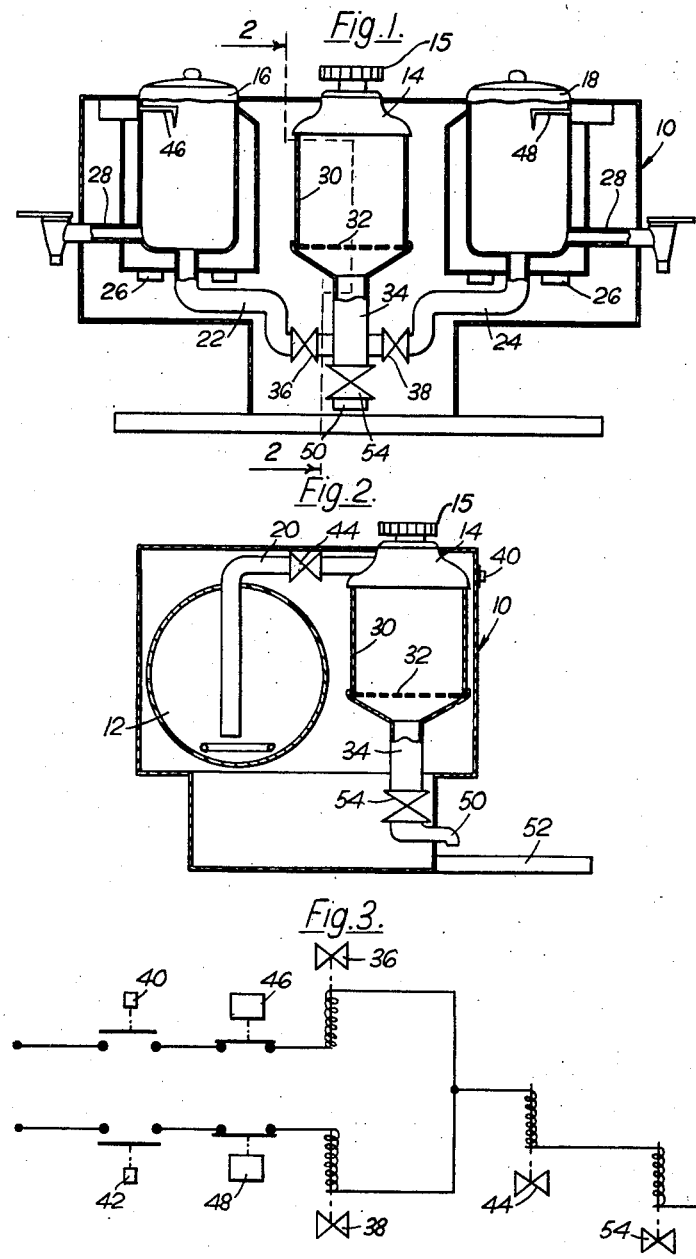

United States Patent Office 3,124,056
Patented Mar. 10, 1964

3,124,056
COFFEE INFUSERS
Cecil Hayes, London, England, assignor to W. M. Still & Sons Limited, London, England, a British company
Filed Aug. 27, 1962, Ser. No. 219,411
Claims priority, application Great Britain Aug. 29, 1961
5 Claims. (Cl. 99—283)

This invention relates to coffee infusers for use in restaurants and similar places. More specifically, the invention is concerned with semi-automatic coffee infusers which are filled with coffee grains and are set in operation by hand, but which regulate themselves automatically during and after infusion of the coffee.

A coffee infuser in accordance with the invention comprises an electrically-heated water boiler provided with a valve-controlled hot water draw-off which is connected to an infusion chamber, the infusion chamber being connected in turn to one or more storage containers for infused coffee having heating means arranged to keep the container or containers in a warm or hot condition, in which the container or containers each have a control device which is sensitive to the liquid level within the container and which is arranged to control means for operating the valve controlling the supply of hot water from the boiler to the infusion chamber so that, when infused coffee delivered to the container from the infusion chamber reaches a certain level, the device is automatically operated and acts so as to close the said water-flow control valve.

Normally the water-flow control valve is in its closed position, but when it is desired to infuse a quantity of coffee grains within the infusion chamber, the valve is opened through a manually-operated electrical button or switch. As indicated above, the valve is closed again after infusion of the coffee by the control device provided in the storage container or containers.

It will thus be seen that, once coffee grains have been placed within the infusion chamber, all that the operator needs to do is to press an electrical switch or button which controls the hot water supply valve. After a few minutes the coffee will have been properly infused and delivered to the storage container or containers, and will be ready for serving without any further attention on the part of the operator. It will be appreciated that the automatic stopping of the flow of hot water once infusion has been completed is very important in restaurants and cafes where the operator has to attend to many other things besides serving coffee.

In order that the invention may be thoroughly understood, a specific coffee infuser in accordance with it will now be described, by way of example, with reference to the accompanying drawings, in which:

FIGURE 1 is a vertical section through the infuser with certain parts shown in diagrammatic form;

FIGURE 2 is a section taken on the line 2—2 in FIGURE 1; and

FIGURE 3 is an electrical circuit forming part of the infuser.

The apparatus illustrated comprises a generally rectangular cabinet 10 of such a size and shape that it can be readily mounted on a service counter. All the main parts of the infuser are housed within this cabinet, including an electrically-heated horizontally-arranged cylindrical boiler 12 (see FIGURE 2), an upright coffee infusion chamber 14, and a pair of upright storage containers 16 and 18 made of glass and arranged one on each side of the infusion chamber 14. Pipe connections 20, 22 and 24 join the boiler 12 to the infusion chamber 14 and the infusion chamber to each of the storage containers 16 and 18 so that coffee can be infused within the chamber 14 and then delivered direct to the storage containers. Each storage container 16 and 18 is seated on an electrical heating element 26 or is heated by steam from the steam space of the boiler 12 so that coffee stored in the containers can be kept hot. The containers also have removable lids so that their contents can be inspected, and are provided with tap-controlled outlets 28 at their lower ends. Normally these outlets will be located on the front panel of the cabinet 10, but for ease of illustration they are shown in this instance as being mounted on opposite ends of the cabinet.

The infusion chamber 14 comprises a cylindrical vessel 30 which can be entirely removed from the cabinet 10 by unscrewing the handle 15 and withdrawing the vessel 30 through a hole in the front of the cabinet so that fresh coffee grains can be placed on a perforated platform 32 within the vessel. Hot water from the boiler 12 is delivered to the top of the infusion chamber 14 and the infused coffee is withdrawn from the infusion chamber through an opening 34 at its lower end. The two pipe lines 22 and 24 connecting the infusion chamber 14 to the two storage containers 16 and 18 include independently-operated solenoid-actuated valves 36 and 38 so that the infusion can be delivered to either one of the storage containers at will.

A disadvantage of coffee infusers marketed hitherto is that they require a certain amount of attention on the part of the operator while the coffee is being infused. In the case of the present infuser, however, the operator needs only to place coffee grains in the infusion chamber 14 and then operate one or other of two electric buttons or switches 40 and 42 (see FIGURE 3), one switch for each storage container. Each of these switches is connected electrically to a solenoid-operated valve 44 controlling the supply of hot water from the boiler 12 to the infusion chamber 14, and also to one of the solenoid-operated valves 36 and 38. Thus, operation of one or other of the switches or buttons 40 or 42 causes the water supply valve 44 and the valve 36 or 38 in the pipe 22 or 24 between the infusion chamber 14 and the storage container 16 or 18 to be opened so that coffee is infused within the chamber and then delivered to the storage container.

At the upper end of each storage container 16 and 18 is a control device 46 and 48 which shuts off the valves 44 and 36 or the valves 44 and 38 automatically directly the infused coffee within the container 16 or 18 reaches a certain level. This device can be in the form of a float-controlled electric switch, but in the best arrangement it comprises an electrical probe which completes an electrical circuit through the liquid directly the liquid touches the probe. By this means it becomes unnecessary for the operator to attend to the machine even after infusion has been completed. After operation of the control device 46 or 48, the infuser is ready and continues to remain ready for the dispensing of coffee from the container. An electric light (not shown) is provided to indicate that infusion is taking place or that the coffee is ready for dispensing.

The lower end of the infusion chamber 14 is provided with a drain outlet 50 so that, once the infusion has been delivered to the container or containers 16, 18, any liquid remaining within the chamber 14 is discharged to waste through a drip tray 52. The drain outlet is controlled by a solenoid-operated valve 54 which is normally open but which is closed automatically on actuation of one of the manually-operated electrical buttons or switches 40, 42.

I claim:

1. A coffee infuser comprising a generally rectangular cabinet housing all the main parts of the infuser and of such a size and shape that it can be readily mounted on a service counter, the said main parts of the infuser including an electrically-heated horizontally-arranged cylindrical boiler disposed in the rear part of said cabinet, an upright coffee infusion chamber located in the front part of the said cabinet, a pair of upright storage containers made of transparent material and arranged one on each side of said infusion chamber, a plurality of pipe connections joining said boiler to said infusion chamber and said infusion chamber to each of said storage containers whereby coffee is infused within said infusion chamber and is then delivered direct to said storage containers, means for heating each storage container so that coffee stored in said storage containers is kept hot, removable lids on said storage containers so that their contents can be inspected, and tap-controlled outlets at the lower ends of said storage containers, said pipe connections connecting said infusion chamber to said two storage containers including two independently-operated solenoid-actuated valves whereby the infusion can be delivered to either one of said storage containers at will, two electric switches, one switch for each storage container, connected electrically to a third solenoid-operated valve contained in said pipe connection connecting said boiler to said infusion chamber, each of said electric switches being respectively connected to said first and second solenoid-operated valves whereby operation of either one of said switches causes said third valve and one of said other valves to be opened so that coffee is infused within said infusion chamber and is then delivered to one of said storage containers, a control device at the upper end of each of said storage containers adapted to close said opened valves automatically directly the infused coffee within said last-mentioned storage container reaches a certain level, said control device comprising an electrical probe arranged to complete an electrical circuit through the infused coffee directly the latter touches said probe.

2. A coffee infuser as claimed in claim 1 wherein each of said storage containers is seated on an electrical heating element.

3. A coffee infuser as claimed in claim 1 wherein said pipe connection connecting said boiler to said infusion chamber leads to the top of said infusion chamber.

4. A coffee infuser as claimed in claim 1 wherein the lower end of said infusion chamber is provided with a drain outlet whereby liquid remaining within said infusion chamber after delivery of the infusion to one of said storage containers is discharged to waste through a drip tray.

5. A coffee infuser as claimed in claim 4 wherein said drain outlet is controlled by yet another solenoid-actuated valve under the control of said electrical switches.

References Cited in the file of this patent

UNITED STATES PATENTS

| | | |
|---|---|---|
| 3,011,426 | Mueller | Dec. 5, 1961 |
| 3,060,835 | Eads | Oct. 30, 1962 |

FOREIGN PATENTS

| | | |
|---|---|---|
| 618,676 | Great Britain | Feb. 25, 1949 |
| 738,796 | Great Britain | Oct. 19, 1955 |